(12) United States Patent
Lang

(10) Patent No.: US 12,357,129 B2
(45) Date of Patent: Jul. 15, 2025

(54) HOUSEHOLD APPLIANCE AND METHOD OF OPERATING A HOUSEHOLD APPLIANCE

(71) Applicant: Vorwerk & Co. Interholding GmbH, Wuppertal (DE)

(72) Inventor: Torsten Lang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 37 days.

(21) Appl. No.: 16/809,975

(22) Filed: Mar. 5, 2020

(65) Prior Publication Data

US 2020/0281411 A1    Sep. 10, 2020

(30) Foreign Application Priority Data

Mar. 7, 2019   (EP) .................................... 19161314

(51) Int. Cl.
*H02H 3/05* (2006.01)
*A47J 43/046* (2006.01)
(Continued)

(52) U.S. Cl.
CPC ......... *A47J 43/0761* (2013.01); *A47J 43/046* (2013.01); *H02H 9/02* (2013.01);
(Continued)

(58) Field of Classification Search
CPC ................................. H01L 33/12; H02P 1/163
See application file for complete search history.

(56) References Cited

U.S. PATENT DOCUMENTS 5,799,567 A * 9/1998 Dorner .................... A47J 27/14
99/348
5,990,726 A * 11/1999 Bauer .................... H02H 3/085
327/512

(Continued)

FOREIGN PATENT DOCUMENTS

CN         2135992 Y      6/1993
CN       102245068 A     11/2011
(Continued)

OTHER PUBLICATIONS

Extended European Search Report for European Application No. 19161314.0 dated Sep. 5, 2019, with its English summary, 8 pages.
(Continued)

*Primary Examiner* — Kawing Chan
*Assistant Examiner* — Charles S Laughlin
(74) *Attorney, Agent, or Firm* — Rudy J. Ng; Bret E. Field; Bozicevic, Field & Francis LLP

(57) ABSTRACT

The invention relates to a household appliance (1) comprising a movable first functional unit (10) for providing a first appliance function to a user, an electrical second functional unit (20) for providing a second appliance function to the user, and an operating device (11) for powering the first functional unit (10), comprising an electric motor (12), a connection (13) for supplying power to the electric motor (12), and a pre-circuit (30) connected between the connection (13) and the electric motor (12), wherein the pre-circuit (30) comprises a current limiting element (31) for limiting a current (200). The invention also relates to a method (100) for operating a household appliance (1).

17 Claims, 3 Drawing Sheets

Figure 1:
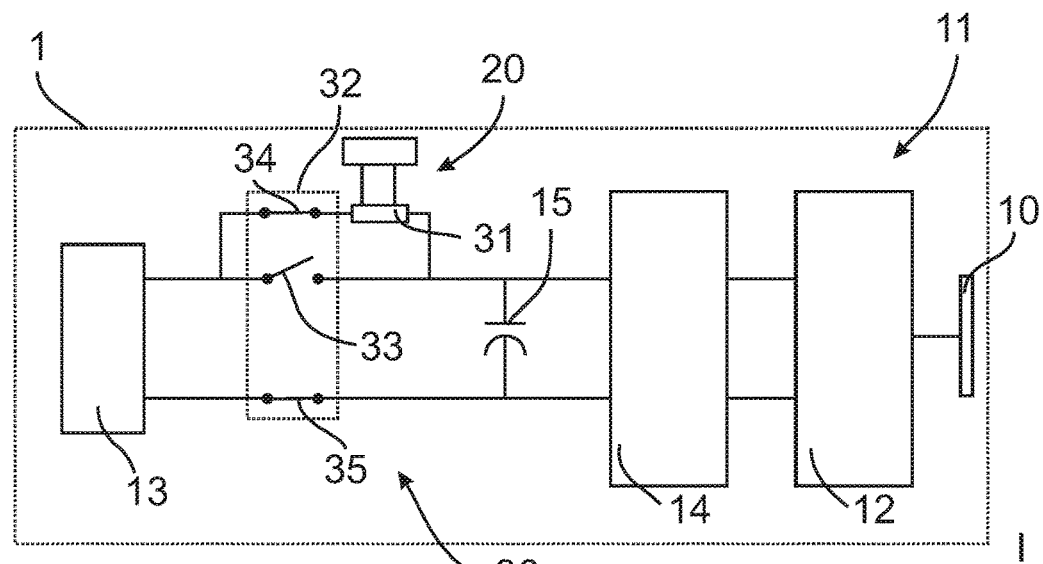

(51) Int. Cl.
*A47J 43/07* (2006.01)
*H02H 9/02* (2006.01)
*H02J 7/34* (2006.01)
*H02P 29/00* (2016.01)
*H05B 3/00* (2006.01)

(52) U.S. Cl.
CPC .............. *H02J 7/345* (2013.01); *H02P 29/00* (2013.01); *H05B 3/0014* (2013.01)

(56) References Cited

U.S. PATENT DOCUMENTS

| | | | |
|---|---|---|---|
| 2006/0131452 A1* | 6/2006 | Caldewey | A47J 43/07 241/36 |
| 2012/0061378 A1 | 3/2012 | Colburn et al. | |
| 2013/0016462 A1* | 1/2013 | Howitt | A47J 27/2105 361/679.01 |

FOREIGN PATENT DOCUMENTS

| | | |
|---|---|---|
| CN | 102438487 A | 5/2012 |
| CN | 104825055 A | 8/2015 |
| DE | 102010016024 B4 | 2/2018 |

OTHER PUBLICATIONS

Office Action for European Patent Application No. 19 161 314.0, mailed Jan. 3, 2022, and its English summary, 5 pages.
Office Action for Chinese Application No. 202010150219.5 mailed on Jul. 5, 2023, with its English Translation, 21 pages.
Office Action for European Application No. 19161314.0 mailed on Sep. 25, 2023, with its English translation, 12 pages.
Office Action for Chinese Patent Application No. 202010150219.5 dated Feb. 7, 2024, and its English translation, 16 pages.
Decision of Rejection for Chinese Patent Application No. 202010150219.5, mailed Jun. 28, 2024, and its English translation, 22 pages.
Liang et al., New Trendy Small Appliance Troubleshooting Technology, Jindun Publishing House, Aug. 2004, and its English translation, 4 pages.

* cited by examiner

HOUSEHOLD APPLIANCE AND METHOD OF OPERATING A HOUSEHOLD APPLIANCE

The invention relates to a household appliance according to the generic term of independent device claim and a method for operating a household appliance.

Electrically operated household appliances are known from the state of the art. An electric motor is often used for this purpose, by means of which, for example, a rotatable or translatory movable element of the household appliance is adjusted in order to perform a certain function of the household appliance. For example, kitchen appliances are known in which the knives for chopping or mixing ingredients are powered into rotation by an electric motor. In order to combine as many functions as possible in a single appliance, such kitchen appliances often have additional functions. However, especially when the electric motor is switched on, high currents can occur which can damage the motor and/or other electrical components.

In order to limit such starting and/or inrush currents, it is also known to connect powerful resistors in series with those electrical components that can cause these starting and/or inrush currents. For example, some NTC resistors are used which have a high resistance in the cold state, which limits the current at power-on and later on, as the temperature increases, have a lower resistance. However, it is a disadvantage that, if the electric motor is switched on and off regularly and/or quickly, the time between switching operations may not be sufficient to cool down the resistance and thus return to the state of high resistance. Furthermore, such additional resistors are often susceptible to vibration (since they often have a ceramic housing) and may have a reduced life span as a result of dynamic loads. Furthermore, additional resistors cause costs and require installation space.

It is an object of the present invention to at least partially eliminate disadvantages known from the prior art. In particular, one of the objects of the present invention is to improve the limitation of a current, in particular when an electrical component is switched on, in a cost-effective manner in a household appliance.

The preceding object is solved by a household appliance with the characteristics of the independent device claim and a method for operating a household appliance with the characteristics of the independent method claim. Further features and details of the invention result from the dependent claims, the description and the drawings. Features and details which have been described in connection with the device according to the invention are of course also valid in connection with the method according to the invention and vice versa, so that the individual aspects of the invention are or can always be mutually referred to with regard to disclosure.

A household appliance comprising a movable first functional unit for providing a first appliance function to a user, an electric second functional unit for providing a second appliance function to the user, and an operating device for powering the first functional unit. The operating device further comprises an electric motor, a connection for supplying power to the electric motor and a pre-circuit, the pre-circuit being connected between the connection and the electric motor. Furthermore, the pre-circuit has a current limiting element for limiting a current (when the operating device is switched on or started; this means: during the time period). The current limiting element is formed by the second functional unit. In particular, the pre-circuit can also be described as the upstream unit.

Limiting the current can be understood in particular as limiting a current peak, inrush current and/or starting current. Preferably, when limiting the current, a current parameter can be reduced in particular to a harmless value. The current limiting element can be connected to the electric motor in such a way that the current limiting element forms a starting resistance for the electric motor. In particular, the current limiting element is connected in series with the electric motor and/or the connection. Preferably, the pre-circuit can be configured to limit the current temporarily, e.g. by enabling and/or disabling the current limiting element. In particular, a connection can be understood as an electrical connection for connection to a power supply system and/or an energy storage device, such as a battery. The connection can also be permanently connected to the power supply system and/or the energy storage during operation of the household appliance. The first and/or the second appliance function can be understood to be, in particular, a main use of the household appliance. In particular, the first function provides a first benefit (e.g. stirring and/or chopping) for the user through the household appliance and the second appliance function provides a second benefit (e.g. heating and/or cooking). The first and second device functions can be independent device functions. The entire second functional unit can form the current limiting element or part of the second functional unit can form the current limiting element.

The fact that the current limiting element is formed by the second functional unit means that an additional benefit of the second functional unit can be generated by using it to provide the second device function on the one hand and as a current limiting element on the other. It can be provided that the second functional unit only temporarily forms the current limiting element and is electrically isolated from the pre-circuit if limiting the current is no longer necessary, e.g. after switching on. In particular, an additional series resistor, in particular in the form of an additional component, can be omitted, so that the relevant costs and installation space can be saved. In particular, the household appliance is thus also robustly configured, because by saving an additional resistor component, a further weak point, which could be damaged by vibrations (e.g. breakage of the ceramic from the resistor), is eliminated.

Preferably, the second functional unit can also have a measuring sensor for measuring a current parameter. The measuring sensor can be connected to the current limiting element in such a way that the current of the pre-circuit at the current limiting element and/or a current during operation of the second functional unit can be measured by the measuring sensor. By measuring the current of the pre-circuit, it is possible, for example, to determine the maximum capacity of a capacity of the operating device, and thus in particular to check its functionality and/or state of charge. In particular, this means that a sensor that is already present on the second functional unit can be used. In particular, further monitoring functions of the second functional unit can also be transferred to the current limiting element and/or the operating device or can be used twice. The current parameter may include, in particular, an electrical voltage and/or a current intensity. The determined state of charge of the capacity can also be used to determine the switching time from a protective switching state I (when switching on or starting up) to an operational switching state II (normal operation of the first functional unit after switching on or starting up) (see definitions of states I/II below).

Furthermore, it is conceivable within the scope of the invention that the operating device comprises a capacitor which can be charged via the connection, the current limiting element being configured to limit the current when the capacitor is charged, in particular wherein the capacitor is an intermediate circuit capacitor. In particular, the current limiting element can be configured as a pre-charging resistor. Preferably, the capacity can also include a film capacitor and/or electrolytic capacitor. If the capacity is at least one intermediate circuit capacitor, the operating device may also have a rectifier via which the electric motor can be supplied and/or controlled. The capacity can be an electrical component that has a high charging current, at least temporarily. In particular, a capacity in the form of an intermediate circuit capacitor can behave like a short circuit if it is completely discharged. However, especially if the first movable functional unit is a safety-related functional unit, it may be desirable to completely discharge the rechargeable capacity when the engine is stopped. Especially in connection with a complete decoupling from an energy source it can be ensured that the motor does not trip due to a malfunction and thus the safety-relevant function is performed when a user does not expect this. This can be the case, for example, with a kitchen appliance that has a stirrer and/or mixer and whose electric motor requires a rechargeable capacity. By configuring the capacitor as a film capacitor and/or electrolytic capacitor, the robustness of the device can be further increased. For example, such capacitors are temperature-resistant over a wide temperature range and are highly reliable.

Furthermore, in a household appliance according to the invention, it may be provided that the second functional unit comprises an electrical resistance heating, the current limiting element being formed by at least one area of a resistance element for heating the resistance heating. The resistive element may, for example, comprise a wire and/or a conductor path and heat up when supplied. The resistor element can be integrated at least partially into the pre-circuit, e.g. by being connected or connectable to the pre-circuit. Electrical resistance heating can be used, for example, to heat food in a kitchen appliance or to perform a different temperature function in the household appliance. In particular, the heating of the resistance heating by the resistance element can be the second device function. The resistor element can form the current limiting element either partially or completely. In particular, several interconnected resistor elements can form the current limiting element either partially or completely. Due to the electrical resistance heating, the prerequisites can thus be met to integrate the second functional unit into the pre-circuit as a current limiting element, especially without significant configuration changes to the second functional unit. At the same time, the electrical resistance heating is a robust element which can be used in a cost-effective and simple way as a current limiting element.

Preferably, in a household appliance according to the invention, the pre-circuit can comprise a switching unit by means of which the pre-circuit can be switched at least between a protective switching state I, in which a current can be limited by the current limiting element (when switching on or starting up), and a (chronologically following) operative switching state II, in which the current limiting element is deactivated (in normal operation). The fact that the current limiting element is deactivated in the operational switching state can be understood in particular to mean that the current limiting element is bridged and/or electrically isolated from the connection and/or from the electric motor. This allows the current limiting element to be deactivated when a current spike has subsided or when there is no longer any danger of a current spike or high current. This means that energy provided at the connection is made available to the motor and is not fed to the current limiting element. This ensures energy-efficient operation of the household appliance and the first and second functional units can be electrically decoupled from each other if current limiting is no longer desired.

Furthermore, in a household appliance in accordance with the invention, it may be provided that the switching unit for switching between the protective switching state and the operative switching state comprises at least a first switching element connected in parallel with the current limiting element and a second switching element connected in series with the current limiting element. A current path can be formed by the first switching element connected in parallel to the current limiting element, by which the current limiting element can be bridged. The second switching element, which is connected in series with the current limiting element, allows the current limiting element to be electrically disconnected from the connection and/or the electric motor. This means that when the second switching element is opened, no current flows through the current limiting element and an electrical decoupling of the first and second functional unit can be realized. The first and/or second switching element can be software and/or hardware switchable. Thus, the switching unit provides a robust possibility to switch between the protective switching state and the operative switching state and to disconnect the current limiting element in a reliable way. Furthermore, when opening the first and second switching element, a complete electrical separation of the motor and/or capacitor from an energy source can be realized. Preferably, the switching unit can have a third switching element by which the safety state can be reached when the first, second and third switching elements are open. In this way a complete separation of the electric motor and/or the capacitor from the connection and/or the current limiting element can be achieved. In particular, the third switching element can be arranged in the pre-circuit in such a way that by opening the third and the first and/or second switching element two different potentials are disconnected from the electric motor and/or capacitor. The safety and reliability of the household appliance can be improved by the possibility of electrical isolation of the connection.

Within the scope of the invention it may further be provided that the switching unit for switching between the protective switching state and the operative switching state comprises at least one relay and/or at least one transistor, in particular in the form of a MOSFET. Preferably, the first and/or second switching element can be configured as a relay and/or transistor, especially in the form of a MOSFET. These are inexpensive, robust components. A MOSFET is a metal oxide semiconductor field-effect transistor which can reliably achieve short switching times and high switching rates. This ensures reliable operation of the household appliance. Furthermore, the relay can be easily controlled and reliably due to the electromagnetic adjustment possibility of the relay. In particular, the complexity of a control system can be significantly reduced by using a relay. The third switching element can also be configured as a relay as a relay and/or transistor, especially in the form of a MOSFET.

Furthermore, in the case of a household appliance conforming to the invention, it may be provided that a motor control unit for controlling the electric motor is connected between the pre-circuit and the electric motor, in particular wherein the electric motor is a converter-operated motor. In particular, a reliable, robust configuration can be achieved with a converter-operated motor. In particular, the motor control unit can be used to retrieve the high motor power. Furthermore, the motor control unit allows the use of an electric motor that is low-maintenance or maintenance-free. Preferably the electric motor can be a brushless motor, especially a reluctance motor. This can further increase the robustness of the household appliance. Furthermore, sensitive electrical components of the motor control unit can be protected against high currents by the pre-circuit, which can occur in particular if the converter-operated motor is to be controlled in a high power range. In order to control the converter-operated motor, the motor control system can preferably have one or more power converters. Furthermore, the motor control unit can be configured to control three or more phases of the electric motor. Thus, the motor control unit can represent an electronic component which could be damaged by a high current, so that the robust realization of the current limiting element by the second functional unit can protect the motor control unit.

Furthermore, in the case of a household appliance according to the invention, it may be provided that the household appliance is a kitchen appliance for preparing food, in particular wherein the first functional unit has a stirrer and/or wherein the second functional unit is arranged in a cooking vessel which is detachable from the operating device. The kitchen appliance may, for example, have an electric resistance heater which forms the second functional unit and is intended for heating food. The mixer may be configured for stirring and/or chopping ingredients. In particular, the agitator may have a stirring device, in particular in the form of a rotatable blade. This means that various work steps can be performed when food is prepared by the household appliance, whereby the second functional unit can be used efficiently if it also forms the current limiting element. If the second functional unit is arranged in a cooking vessel in such a way that it can be detached from the operating device, the cooking vessel can be easily cleaned by the user and, in particular when connected to the operating device, it can form the current limiting element.

Furthermore, in the case of a household appliance in accordance with the invention, it may be provided that the second functional unit is connected to the operating device, in particular to the pre-circuit, by means of an electrical contact, preferably in the form of a plug connection, whereby the second functional unit can be detached from the operating device, i.e. in particular from the operating device. The plug-in connection provides a simple way of electrically decoupling the second functional unit from the operating device and the electrical connection and of using the second functional unit independently of the operating device. This allows the second functional device to be located in a cooking vessel, for example, which can be cleaned in a dishwasher. Thus, the comfort of the household appliance can be increased without making the household appliance less robust for daily use. The plug connection may in particular have a plug and a socket, in particular where the plug may be located on the second functional unit and the socket on the operating device or vice versa. In addition or alternatively, the electrical contacting can have two exposed electrical contacts, which provide an electrical connection when contacting each other.

According to a further aspect of the present invention, a method for operating a household appliance, in particular a household appliance conforming to the invention, is claimed. The household appliance has a movable first functional unit to provide a first appliance function for a user. The method comprises at least the following step:

Operation of an operating device for powering the first functional unit of the household appliance by means of an electric current, the current being limited (in particular when the operating device is switched on or started) by a second functional unit of the household appliance which is configured to provide a second appliance function for the user.

Thus, an inventive method provides the same advantages as those described in detail with respect to an inventive home appliance. In particular, the operation of the operating device can be performed (exclusively) during a switching-on or starting (a) of the household appliance and/or (b) of an electric motor of the operating device and/or during a charging (c) of a capacitor connected upstream of the electric motor. The operation of the operating device may thus involve in particular starting and/or operating the electric motor.

Preferably a measurement of a current parameter of the current can be performed by the second functional unit, in particular a measuring sensor of the second functional unit. In particular, it is possible to measure the current at the operating device, in particular a pre-circuit of the operating device, and/or a current during operation of the second functional unit. On the basis of the measurement of the pre-circuit, it can be provided that, for example, a maximum capacity of a capacity of the operating device is determined, and thus in particular its operability is checked. In particular, this means that a sensor that is already present on the second functional unit can be used. In particular, further monitoring functions of the second functional unit can also be transferred to the current limiting element and/or the operating device or can be used twice.

Furthermore, in a method according to the invention, it may be provided that at least during operation of the operating device, a capacity of the household appliance is charged, whereby a charging current of the capacity is limited when the current is limited. In particular, the current which is limited may therefore be the charging current. The capacity can be used to buffer a current for an electric motor. A critical point may be to charge the capacity when the capacity is completely discharged. This can be the case, for example, after a switch to the security state has been performed. Although the safety of the first functional unit is guaranteed in the safety state, a high current may occur when the capacity is recharged. This can be limited by the second functional unit.

Furthermore, in a method according to the invention, it may be provided that the current is limited in a protective switching state of the operating device, in particular a pre-circuit of the operating device, and the method comprises at least one of the following steps:

Switching over to an operational switching state of the operating device, in particular the pre-circuit, in which the limiting of the current by the second functional unit is deactivated, and/or Switching over in a safety state of the operating device, in particular of the pre-circuit, in which an electric motor of the operating device is electrically isolated from a connection of the operating device.

By switching to the operative switching state, in particular no current of the electric motor flows via the current limiting element or via the second functional unit. This means that the first and second functional units can be electrically disconnected in the operative switching state and operated independently of each other. In particular, the first functional unit is operated by the electric motor in the operational switching state. By deactivating the current limiting element, the resistance from the connection to the electric motor is also reduced, so that in normal operation of the electric motor the losses can be reduced. When switching the pre-circuit to the safety state, the electric motor is preferably completely disconnected from the connection. Preferably, this is done by opening one or more switching elements, especially a switching unit of the pre-circuit. Furthermore, in the safety state, a discharge of a capacity of the operating device, preferably via the electric motor, can take place. Thus, in the safety state, the electric motor can be supplied via the motor control unit in such a way that a rotor of the electric motor does not turn. For example, the phases of the electric motor can be controlled accordingly so that the rotor does not move, but any voltage still present in the capacitor is reduced. This prevents the electric motor from being switched on unintentionally in the safety state. In the operational switching state, normal operation of the first and/or second functional unit in particular may be enabled and/or executed.

Preferably, a method according to the invention may provide that when switching to the operative switching state, the second functional unit is at least partially bridged and/or electrically disconnected from the connection and/or from the electric motor. This allows the electric motor to be operated without the need for an intermediate current limiting element. Thus, energy consumption can be reduced and the first functional unit can be decoupled from the second functional unit when an operational switching state is reached in which a starting current is not expected.

Preferably, in a method according to the invention, the following steps may be provided for when the pre-circuit is switched to the operative switching state:

Closing of a first switching element of a switching unit of the operating device, which is at least partially connected in parallel to the second functional unit, Opening a second switching element of the switching unit, which is at least partially connected in series with the second functional unit.

Thus, a simple switching sequence of the operative switching state can be achieved and the second functional unit can be electrically isolated from the connection or the electric motor. By the fact that the first switching element is at least partially connected in parallel with the second functional unit, it can be understood that the first switching element is connected or can be connected in parallel at least with the current limiting element formed by the second functional unit. The fact that the second switching element is at least partially connected in series with the second functional unit can be understood to mean that the second switching element is connected in series or can be connected in series at least with the current limiting element formed by the second functional unit. The first and/or second switching element may preferably be a relay, a transistor, in particular in the form of a MOSFET, or another switching element. Preferably, the switching unit can have a third switching element, by which the safety state can be reached when the third switching element is opened, especially if the first, second and third switching element are also opened. In this way a complete separation of the electric motor and/or the capacitor from the connection and/or the current limiting element can be achieved.

Within the scope of the invention, it may also be provided that the second functional unit has an electric resistance heating which is supplied at least in certain areas when the current is limited. In particular, a current limiting element can be formed by a resistance element of the resistance heating for heating the resistance heating, which is at least partially supplied when the current is limited by the second functional unit. Resistance heating can thus be an already existing component of the household appliance, which is advantageously suited to limit the current while retaining its main function, which is to guarantee the heating function. For the electrical coupling and decoupling of the first and second functional unit, the pre-circuit can also be configured in a particularly simple manner if the second functional unit is configured to generate heat by means of an electrical resistance anyway.

Figure 2:
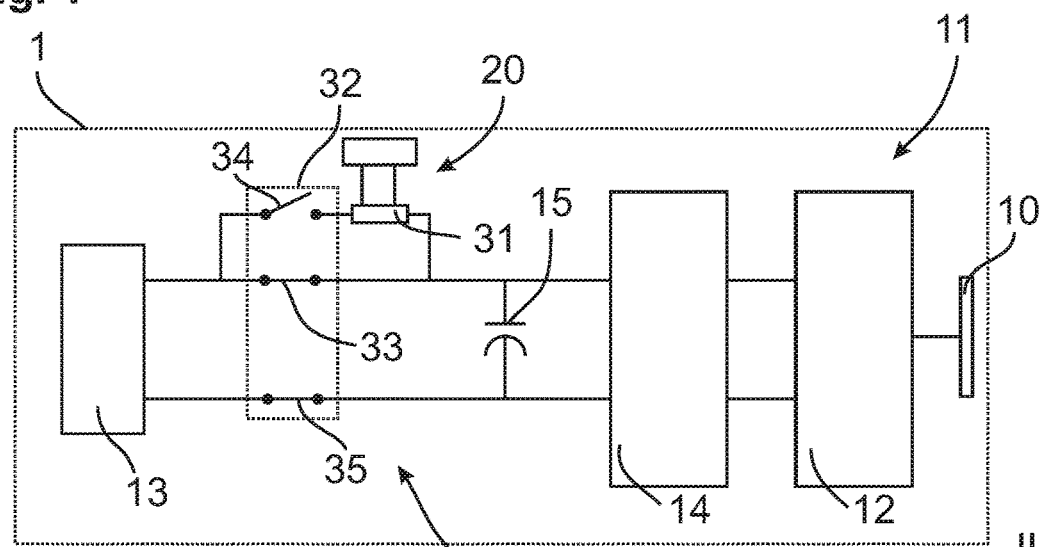
Figure 3:
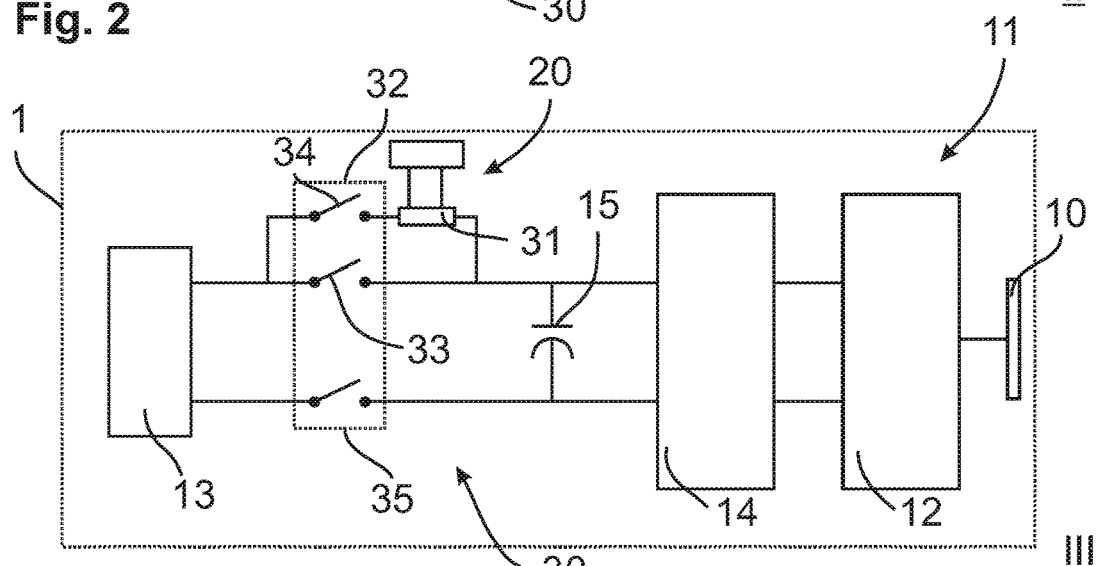

Further measures to improve the invention are described in the following description of some embodiments of the invention, which are shown schematically in the figures. All features and/or advantages resulting from the claims, the description and the drawings, including constructional details, spatial arrangements and procedural steps, may be essential to the invention, both individually and in various combinations. It should be noted that the figures are only descriptive in character and are not intended to limit the invention in any way. It is shown:

FIGS. 1-3: Switching states of a household appliance according to the invention in a schematic representation of a first embodiment, FIG. 4: a schematic representation of method steps in a method according to the invention for operating the household appliance of the first embodiment, FIG. 5: an exemplary current course during charging of a capacitor in schematic representation, FIG. 6: a household appliance in the form of a kitchen appliance according to a further embodiment, FIG. 7: a second functional unit of the kitchen appliance in schematic representation.

In the following figures, the identical reference signs are used for the same technical characteristics even from different embodiments.

Figure 4:
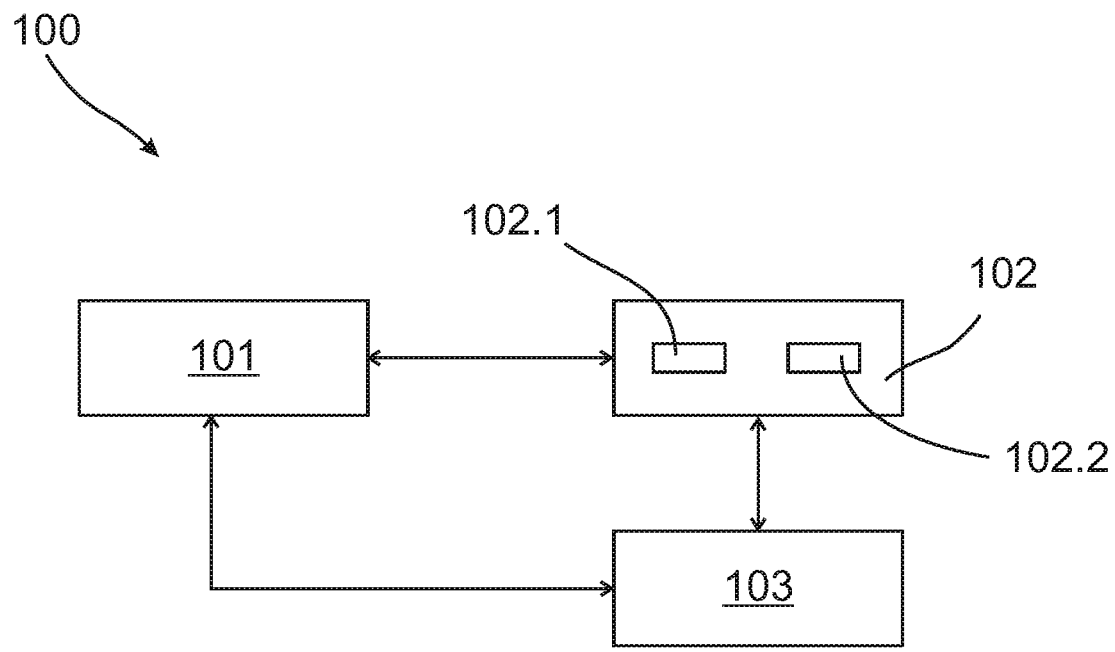
Figure 5:
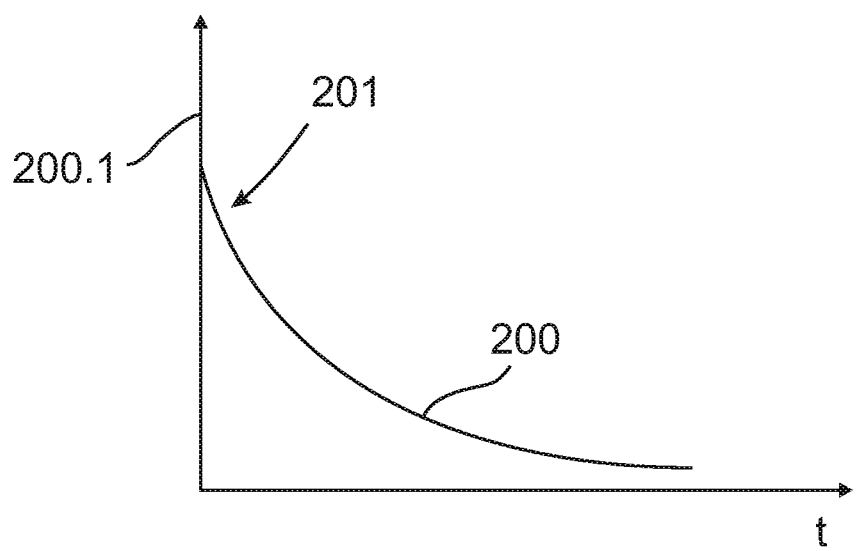

FIG. 1 shows a household appliance 1 with a first functional unit 10 for providing a first appliance function to a user, whereby the first functional unit 10 is movable. The household appliance 1 can be operated in particular by a method 100, as shown in FIG. 4 in a schematic representation of method steps. In addition, household appliance 1 has an electrical second functional unit 20 to provide a second appliance function for the user. The first functional unit 10 can be further operated by an operating device 11 which has an electric motor 12 and a connection 13 for supplying power to the electric motor 12, and between the connection 13 and the electric motor 12 there is also connected an pre-circuit 30 which has a current limiting element 31 for limiting a current 200. Furthermore, the operating device 11 has a motor control 14 and a capacity 15 to control the electric motor 12. The capacity 15 can preferably be configured as a film capacitor and/or intermediate circuit capacitor. However, other forms of capacity 15 are still conceivable. In particular, the electric motor 12 is an electric operated motor, preferably a reluctance motor. In order to operate the electric motor 12 efficiently, the motor control 14 and the capacitor 15 are connected between connection 13 and electric motor 12. The capacity 15 allows a current 200 from connection 13 to be buffered for the electric motor 12, whereby the motor control 14 preferably has one or more power converters. In particular, a rectifier can be provided if capacity 15 is configured as an intermediate circuit capacitor. If the capacity 15 is completely discharged, a charge current could be generated when recharging the capacity 15, which has a course as shown in FIG. 5 as an example. In particular, such or similar starting currents can also be caused by the electric motor 12 during start-up.

FIG. 5 shows a curve of a current parameter 200.2 of a current 200, in particular a current intensity, versus the time t, which has at least one current peak 201 at the beginning of switch-on. At least current peak 201 of current 200 can be limited by the pre-circuit 30 or by the current limiting element 31, e.g. by reducing or eliminating current peak 201. This ensures a harmless value of the current parameter 200.2 during a switch-on method of household appliance 1.

In the household appliance 1 in accordance with the invention, it is provided that the current limiting element 31 is formed by the second functional unit 20 of the household appliance 1. At least one area of the second functional unit 20, which is also used to perform the second device function, can also be used as a current limiting element 31. Furthermore, the area is electrically connected to the pre-circuit 30 either detachably or non-detachably. FIG. 1 shows a protective switching state I in which a switching unit 32 of the pre-circuit 30 is connected in such a way that the current 200 flows from connection 13 to the capacitor 15 and/or to the electric motor 12 via the current limiting element 31 and thus via the second functional unit 20. For this purpose, a first switching element 33, which is connected in parallel to the current limiting element 31, is open and a second and a third switching element 34, 35 of the switching unit 32 are closed. The second switching element 34 is connected in series with the current limiting element 31. The third switching element 35 is preferably used to connect a further potential of connection 13 with the capacitor 15 and/or the electric motor 12. In particular in protective circuit state I, operation 101 of the operating device 11, in particular of the electric motor 12, may be provided by the electric current 200, the current 200 being limited by the second functional unit 20.

Furthermore, a switching 102 of the operating device 11, in particular of the pre-circuit 30, to an operative switching state II in which the current limiting element 31 is deactivated may be provided. For this purpose, closing 102.1 of the first switching element 33 of the switching unit 32 and opening 102.2 of the second switching element 34 can be provided. This bypasses the current limiting element 31 and electrically disconnects it from connection 13 and/or electric motor 12, as shown in FIG. 2. This allows the capacity 15 and the electric motor 12 to be operated independently of the current limiting element 31 and the second functional unit 20, so that energy consumption is not affected by the additional current limiting.

If the electric motor 12 and/or the household appliance 1 is to be switched off safely, it is preferable to switch 103 to a safety state III, as shown in FIG. 3. The first, second and third switching elements 33, 34, 35 are opened to achieve complete electrical isolation. In particular, a discharge of the capacity 15 can be provided by supplying the electric motor 12 with current through the motor control unit 14 in such a way that a rotor of the electric motor 12 does not turn.

Figure 6:
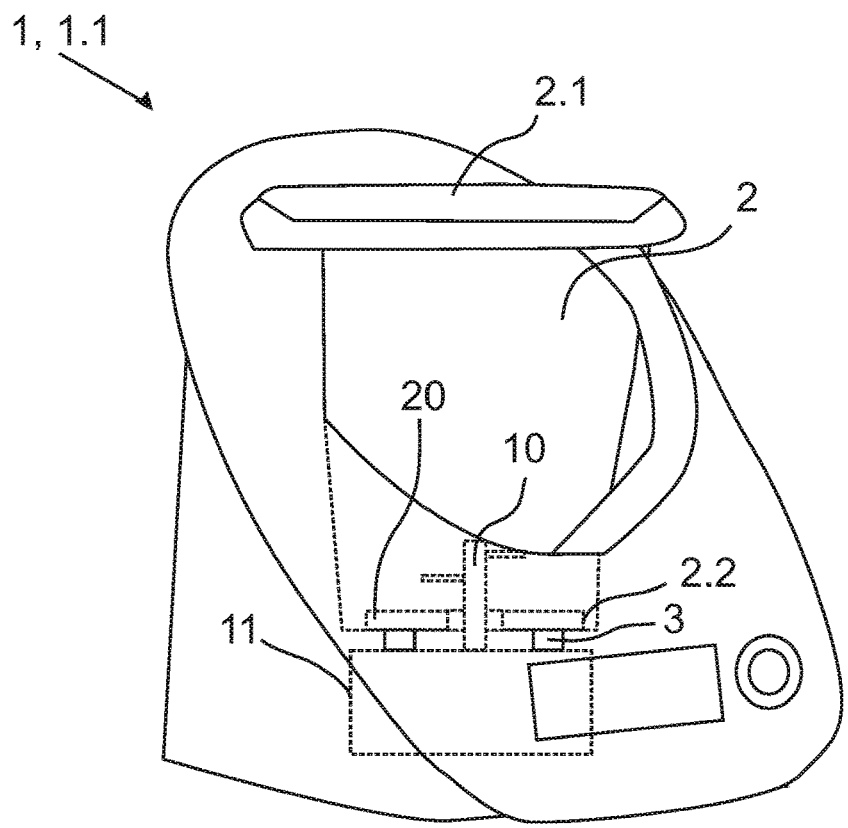
Figure 7:
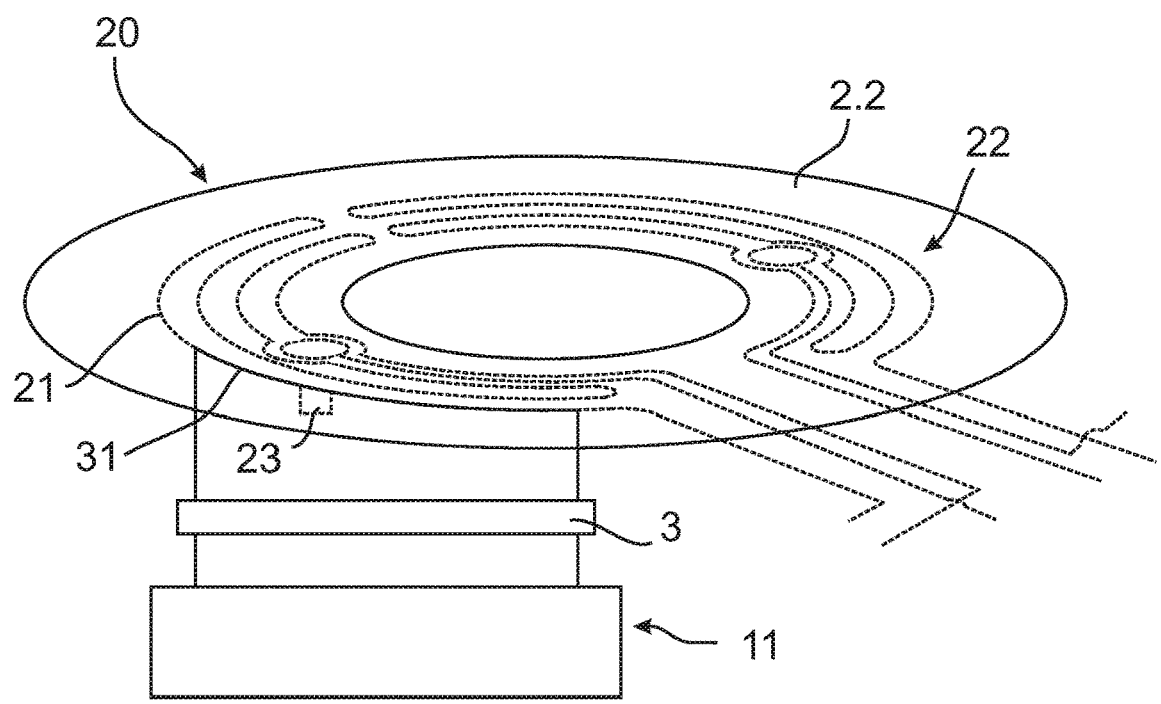

FIG. 6 also shows a household appliance 1 in the form of a kitchen appliance 1.1 with a movable first functional unit 10 to provide a first appliance function for a user. The first functional unit 10 comprises an agitator, in particular in the form of a rotatable knife, so that ingredients can be chopped and/or mixed in the kitchen appliance 1.1 as part of the first appliance function. In addition, food processor 1.1 has an electric second functional unit 20 to provide a second appliance function for the user. For this purpose, the second functional unit 20 includes an electrical resistance heating 21, as shown in FIG. 7. The first and second functional units 10, 20 are arranged in a cooking vessel 2 of food processor 1.1, so that ingredients placed in cooking vessel 2 can be processed by the first functional unit 10 and the second functional unit 20. In particular, the first functional unit 10 and/or the operating device 11 may be passed through a base 2.2 of cooking vessel 2. Preferably, the second functional unit 20 can be located at the base 2.2 of cooking vessel 2. In order to operate the first functional unit 10, the food processor 1.1 also has aa operating device 11 with an electric motor 12, which can be configured according to the first embodiment. The operating device 11 has a pre-circuit 30 with a current limiting element 31 for limiting a current 200, whereby the current limiting element 31 is formed by the second functional unit 20. The resistance heating 21 has at least one resistance element 22 which, when supplied, can lead to heating of the resistance heating 21 and thus heat the ingredients in cooking vessel 2. Furthermore, the resistance element 21 is connected to the operating device 11 by electrical contact 3, in particular in the form of a plug connection, and is electrically connected to the pre-circuit 30. In particular, several interconnected resistor elements 22 can form the current limiting element 31 either partially or completely. By means of the electrical contact 3, in particular the plug connection, the cooking vessel 2 with the first and second functional units 10, 20 can be detached from the operating device 11 and thus be used, for example, for pouring out the ingredients and/or cleaning independently of the operating device 11. Preferably, switching 103 to safety state III of the operating device 11 is done automatically when a lid 2.1 of cooking vessel 2 is opened, so that the stirrer of the first functional unit 10 does not trip unintentionally. Preferably the resistance heating 21 can also have a measuring sensor 23 for measuring a current parameter. The measuring sensor 23 can be arranged at the resistance element 21 in such a way that a current 200 of the pre-circuit 30 at the current limiting element 31 and/or a current during operation of the resistance heating 21 can be measured by the measuring sensor 23.

By measuring the current 200 of the pre-circuit 30, for example, a maximum capacity of a capacity 15 of the operating device 11 can be determined, and thus in particular its operability can be checked. In particular, this means that a sensor already present on resistance heater 21 can be used.

The above explanation of the embodiments describes the present invention exclusively within the scope of examples. It goes without saying that individual features of the embodiments can be freely combined with each other, provided that it is technically reasonable, without leaving the scope of the present invention.

LIST OF REFERENCE SIGNS

1 Household appliance
1.1 Kitchen appliance
2 Cooking utensil
2.1 Lid
2.2 Base from 2
3 Electrical contact
10 $1^{st}$ functional unit
11 Operating device
12 Electric motor
13 Connection
14 Motor control unit
15 Capacity
20 $2^{nd}$ functional unit
21 Resistance heating
22 Resistance element
23 Measuring sensor
30 Pre-circuit 31 Current limiting element
32 Switching unit
33 First switching element
34 Second switching element
35 Third switching element
100 Methods
101 Operating from 30 in I
102 Switching from 30 in II
200 Charging current
200.1 Current parameters
201 Current peak
I Protective switch status
II Operative switch state

The invention claimed is:

1. A food processor comprising:
a movable first functional unit for providing a first device appliance to a user; and
an operating device for powering the first functional unit, comprising:
  an electric motor,
  a connection for supplying power to the electric motor, and
  a pre-circuit connected between the connection and the electric motor;
the food processor further comprising:
  a cooking vessel which is configured to be detachable from the operating device; and
  an electrical second functional unit for providing a second appliance function to the user,
    the second functional unit comprising an electrical resistance heater with a resistance element for heating the resistance heater, the electrical resistance heater thereby being configured to heat food in the cooking vessel by the resistance element to perform the second appliance function, wherein at least a section of the resistance element forms a current limiting element for limiting a current in the pre-circuit by being electrically connected to the pre-circuit, and
    the second functional unit with the current limiting element being arranged in the cooking vessel, thereby being detachable from the motor of the operating device.

2. The food processor according to claim 1, wherein,
the operating device comprises a capacitor which can be charged via the connection, the current limiting element being configured to limit a current when the capacitor is being charged.

3. The food processor according to claim 1, wherein,
the resistance element comprises a wire and/or a conductor path and heats up when supplied.

4. The food processor according to claim 1, wherein,
the pre-circuit comprises a switching unit for switching the pre-circuit at least between a protective switch state, in which a current is limited by the current limiting element, and an operative switch state, in which the pre-circuit connects the connection for supplying power and the electric motor and in which the limitation of the current by the current limiting element is deactivated by bridging the second functional unit between the connection for supplying power and the electric motor or by disconnecting the second functional unit from the electric motor.

5. The food processor according to claim 4, wherein,
the switching unit for switching between the protective switch state and the operative switch state comprises at least one first switching element, which is connected in parallel with the current limiting element, and a second switching element, which is connected in series with the current limiting element.

6. The food processor according to claim 4, wherein,
the switching unit for switching between the protective switch state and the operative switch state at least has at least one relay or at least one transistor.

7. The food processor according to claim 1, wherein,
a motor control unit for powering the electric motor is connected between the pre-circuit and the electric motor.

8. The food processor according to claim 1, wherein,
the second functional unit is connected to the operating device by means of an electrical contact, preferably in the form of a plug connection.

9. The food processor according to claim 1,
wherein the first functional unit is arranged in the cooking vessel of the food processor, wherein the first functional unit and the second functional unit are configured to process ingredients placed in cooking vessel.

10. A method for operating a food processor with a movable first functional unit for providing a first appliance function for a user, comprising at least the following step:
operating an operating device for powering the first functional unit of the food processor by an electric current,
wherein the operating device comprises:
an electric motor,
a connection for supplying power to the electric motor, and
a pre-circuit connected between the connection and the electric motor;
the food processor further comprising:
  a cooking vessel which is configured to be detachable from the operating device; and
  an electrical second functional unit for providing a second appliance function to the user,
  the current in the pre-circuit being limited by a current limiting element formed by the second functional unit, and
  the second functional unit comprises an electrical resistance heater with a resistance element for heating the resistance heater, the electrical resistance heater thereby being configured to heat food in the cooking vessel by the resistance element to perform the second appliance function, wherein at least a section of the resistance element forms the current limiting element for limiting a current in the pre-circuit by being electrically connected to the pre-circuit, wherein the current limiting element is arranged in the cooking vessel, thereby being detachable from the motor of the operating device.

11. The method according to claim 10, wherein,
a capacity of the food processor is charged at least during operation of the operating device, a charging current of the capacity being limited when the current is limited.

12. The method according to claim 10,
wherein,
the current is limited in a protective switching state of the operating device, and the method comprises at least one of the following steps:
  Switching into an operative switching state in which the limiting of the current by the second functional unit is deactivated, or
  Switching to a safety state of the operating device, in which an electric motor of the operating device is electrically disconnected from a connection of the operating device.

13. The method according to claim 12,
wherein,
when switching to the operative switch state, the second functional unit is at least partially bridged or electrically disconnected from at least the connection or from the electric motor.

14. The method according to claim 12,
wherein,
the following steps are performed when switching to the operative switch state:
  Closing of a first switching element of a switching unit of the operating device, which is connected at least partially in parallel with the second functional unit, and
  Opening of a second switching element of the switching unit, which is connected at least partially in series with the second functional unit.

15. The method according to claim 10,
wherein,
the second functional unit has an electrical resistance heater which is supplied with current at least in certain areas when the current is limited.

16. The method according to claim 12,
wherein,
the method comprises the following step:
  Switching into an operative switching state, after the switching on or starting, of the operating device.

17. The food processor according to claim 1, wherein the resistance element is formed by at least a wire or a conductor path.

* * * * *